(12) United States Patent
Nekozuka et al.

(10) Patent No.: US 11,970,242 B2
(45) Date of Patent: *Apr. 30, 2024

(54) BRAKE LEVER AND TRANSMISSION

(71) Applicant: KYOCERA CORPORATION, Kyoto (JP)

(72) Inventors: Hikaru Nekozuka, Yokohama (JP);
Nobuki Hiramatsu, Yokohama (JP);
Hiromichi Yoshikawa, Yokohama (JP);
Sunao Hashimoto, Yokohama (JP)

(73) Assignee: KYOCERA CORPORATION, Kyoto (JP)

(*) Notice: Subject to any disclaimer, the term of this patent is extended or adjusted under 35 U.S.C. 154(b) by 131 days.

This patent is subject to a terminal disclaimer.

(21) Appl. No.: 17/628,220

(22) PCT Filed: Jul. 17, 2020

(86) PCT No.: PCT/JP2020/027961
§ 371 (c)(1),
(2) Date: Jan. 19, 2022

(87) PCT Pub. No.: WO2021/015146
PCT Pub. Date: Jan. 28, 2021

(65) Prior Publication Data
US 2022/0355901 A1  Nov. 10, 2022

(30) Foreign Application Priority Data

Jul. 24, 2019 (JP) .................. 2019-136328
Jul. 24, 2019 (JP) .................. 2019-136360

(51) Int. Cl.
*B62M 25/08* (2006.01)
*B60T 7/08* (2006.01)
(Continued)

(52) U.S. Cl.
CPC ............. *B62M 25/08* (2013.01); *B60T 7/085* (2013.01); *B62K 23/06* (2013.01); *B62L 3/02* (2013.01);
(Continued)

(58) Field of Classification Search
CPC ....... B62M 9/122; B62M 25/08; B60T 7/085; B60T 7/102; B62K 23/06; B62L 3/02; H01Q 1/325; H01Q 9/0407; B62J 45/00
See application file for complete search history.

(56) References Cited

U.S. PATENT DOCUMENTS 10,828,532 B2  11/2020  Izuru
11,015,705 B2* 5/2021  Ho .................. B62K 23/02
(Continued)

FOREIGN PATENT DOCUMENTS

CN  205652331 U  10/2016
CN  206885325 U  1/2018
(Continued)

OTHER PUBLICATIONS

Yasutaka Murakami et al., Low-Prolile Design and Bandwidth Characteristics of Artificial Magnetic Conductor with Dielectric Substrate, 2015, p. 172-179, vol. J 98-B No. 2, IEEE, Japan, 9pp.
(Continued)

*Primary Examiner* — Adam D Rogers
(74) *Attorney, Agent, or Firm* — HAUPTMAN HAM, LLP

(57) ABSTRACT

A brake lever and a transmission with a novel antenna are provided. The brake lever is attachable to the handlebar. The brake lever includes a long portion configured as including an electrically conductive material and an antenna located on the long portion. The antenna includes a first conductor, a second conductor facing the first conductor in a first direction, a third conductor, a fourth conductor, and a power (Continued)

supply line configured to be electromagnetically connected to the third conductor. The third conductor is located between the first conductor and the second conductor, is configured to capacitively connect the first conductor and the second conductor, and extends in the first direction. The fourth conductor is connected to the first conductor and the second conductor and extends in the first direction. The fourth conductor faces the long portion.

17 Claims, 9 Drawing Sheets

(51) Int. Cl.
  *B62K 23/06* (2006.01)
  *B62L 3/02* (2006.01)
  *B62M 9/122* (2010.01)
  *H01Q 1/32* (2006.01)
  *B60T 7/10* (2006.01)
  *B62J 45/00* (2020.01)
  *H01Q 9/04* (2006.01)

(52) U.S. Cl.
  CPC ............ *B62M 9/122* (2013.01); *H01Q 1/325* (2013.01); *B60T 7/102* (2013.01); *B62J 45/00* (2020.02); *H01Q 9/0407* (2013.01)

(56) References Cited

U.S. PATENT DOCUMENTS

| | | | | |
|---|---|---|---|---|
| 11,155,319 | B2 * | 10/2021 | Luman | B62K 23/06 |
| 11,459,061 | B2 * | 10/2022 | Ho | B62M 25/08 |
| 11,483,029 | B2 * | 10/2022 | Uchimura | H01Q 1/2216 |
| 11,502,387 | B2 | 11/2022 | Isoyama | B60C 23/0498 |
| 11,764,479 | B2 * | 9/2023 | Hashimoto | H01Q 9/0414 |
| | | | | 340/432 |

| | | | |
|---|---|---|---|
| 2010/0024590 | A1 | 2/2010 | O'Neill et al. |
| 2013/0150028 | A1 | 6/2013 | Akins et al. |
| 2015/0130673 | A1 | 5/2015 | Ng et al. |
| 2015/0345925 | A1 | 12/2015 | Smit et al. |
| 2017/0025744 | A1 | 1/2017 | Becze et al. |
| 2017/0115660 | A1 | 4/2017 | Caubel et al. |
| 2018/0233810 | A1 | 8/2018 | Sun |
| 2018/0268668 | A1 | 9/2018 | Tetsuka |
| 2020/0262510 | A1 * | 8/2020 | Hahn ................ B62M 6/45 |
| 2020/0346714 | A1 * | 11/2020 | Hahn ................ B62J 45/414 |
| 2021/0036400 | A1 * | 2/2021 | Hashimoto ........ H01Q 21/065 |
| 2021/0036736 | A1 | 2/2021 | Uchimura et al. |
| 2021/0057809 | A1 | 2/2021 | Yoshikawa et al. |
| 2022/0355901 | A1 | 11/2022 | Nekozuka et al. |

FOREIGN PATENT DOCUMENTS

| | | | |
|---|---|---|---|
| CN | 206907920 U | | 1/2018 |
| CN | 116133968 A | * | 5/2023 |
| EP | 3159254 A1 | | 4/2017 |
| EP | 3173796 A1 | | 5/2017 |
| GB | 2067842 A | | 7/1981 |
| JP | 2000095181 A | | 4/2000 |
| JP | 2000131090 A | | 5/2000 |
| JP | 2001188998 A | | 7/2001 |
| JP | 2007059966 A | | 3/2007 |
| JP | 2007230340 A | | 9/2007 |
| JP | 2011116324 A | | 6/2011 |
| JP | 2017052313 A | | 3/2017 |
| JP | 2017124814 A | | 7/2017 |
| JP | 7041690 B2 | | 3/2022 |
| WO | 2017111612 A1 | | 6/2017 |

OTHER PUBLICATIONS

Yasutaka Murakami et al., Optimum Configuration of Reflector for Dipole Antenna with AMC Reflector, 2015, p. 1212-1220, vol. 98-B No. 11, IEEE, 10pp.

* cited by examiner

BRAKE LEVER AND TRANSMISSION

RELATED APPLICATIONS

The present application is a National Phase of International Application Number PCT/JP2020/027961 filed Jul. 17, 2020, and claims the priority of Japanese Patent Application No. 2019-136328 filed Jul. 24, 2019, and Japanese Patent Application No. 2019-136360 filed Jul. 24, 2019.

TECHNICAL FIELD

The present disclosure relates to a brake lever and a transmission.

BACKGROUND ART

Electromagnetic waves emitted from an antenna are reflected by a metal conductor. A 180° phase shift occurs in the electromagnetic waves reflected by the metal conductor. The reflected electromagnetic waves combine with the electromagnetic waves emitted from the antenna. The amplitude may decrease as a result of the electromagnetic waves emitted from the antenna combining with the phase-shifted electromagnetic waves. As a result, the amplitude of the electromagnetic waves emitted from the antenna reduces. The effect of the reflected waves is reduced by the distance between the antenna and the metal conductor being set to ¼ of the wavelength λ of the emitted electromagnetic waves.

To address this, a technique for reducing the effect of reflected waves using an artificial magnetic wall has been proposed. This technology is described, for example, in Non-Patent Literature (NPL) 1 and 2.

CITATION LIST

Non-Patent Literature

NPL 1: Murakami et al., "Low-Profile Design and Bandwidth Characteristics of Artificial Magnetic Conductor with Dielectric Substrate", IEICE Transactions on Communications (B), Vol. J98-B No. 2, pp. 172-179

NPL 2: Murakami et al., "Optimum Configuration of Reflector for Dipole Antenna with AMC Reflector", IEICE Transactions on Communications (B), Vol. J98-B No. 11, pp. 1212-1220

SUMMARY OF INVENTION

Technical Problem

However, the techniques described in NPL 1 and 2 require a large number of resonator structures to be aligned.

An object of the present disclosure is to provide a brake lever and a transmission provided with a novel antenna.

Solution to Problem

A brake lever according to an embodiment of the present disclosure is attachable to the handlebar. The brake lever includes a long portion configured as including an electrically conductive material and an antenna located on the long portion. The antenna includes a first conductor, a second conductor facing the first conductor in a first direction, a third conductor, a fourth conductor, and a power supply line configured to be electromagnetically connected to the third conductor. The third conductor is located between the first conductor and the second conductor, is configured to capacitively connect the first conductor and the second conductor, and extends in the first direction. The fourth conductor is connected to the first conductor and the second conductor and extends in the first direction. The fourth conductor faces the long portion.

A transmission according to an embodiment of the present disclosure is a transmission for a bicycle. The transmission includes an antenna and a pulley portion configured as including an electrically conductive material. The antenna includes a first conductor, a second conductor facing the first conductor in a first direction, a third conductor, a fourth conductor, and a power supply line electromagnetically connected to the third conductor. The third conductor is located between the first conductor and the second conductor, capacitively connects the first conductor and the second conductor, and extends in the first direction. The fourth conductor is connected to the first conductor and the second conductor and extends in the first direction. The fourth conductor faces the pulley portion.

Advantageous Effects of Invention

According to an embodiment of the present disclosure, a brake lever and a transmission with a novel antenna may be provided.

DESCRIPTION OF EMBODIMENTS

In the present disclosure, "dielectric material" may include a composition of either a ceramic material or a resin material. Examples of the ceramic material include an aluminum oxide sintered body, an aluminum nitride sintered body, a mullite sintered body, a glass ceramic sintered body, crystallized glass yielded by precipitation of a crystal component in a glass base material, and a microcrystalline sintered body such as mica or aluminum titanate. Examples of the resin material include an epoxy resin, a polyester resin, a polyimide resin, a polyamide-imide resin, a polyetherimide resin, and resin materials yielded by curing an uncured liquid crystal polymer or the like.

The "electrically conductive material" in the present disclosure may include a composition of any of a metal material, an alloy of metal materials, a cured metal paste, and a conductive polymer. Examples of the metal material include copper, silver, palladium, gold, platinum, aluminum, chrome, nickel, cadmium lead, selenium, manganese, tin, vanadium, lithium, cobalt, and titanium. The alloy includes a plurality of metal materials. The metal paste includes the result of kneading a powder of a metal material with an organic solvent and a binder. Examples of the binder include an epoxy resin, a polyester resin, a polyimide resin, a polyamide-imide resin, and a polyetherimide resin. Examples of the conductive polymer include a polythiophene polymer, a polyacetylene polymer, a polyaniline polymer, and a polypyrrole polymer.

Embodiments according to the present disclosure will be described below with reference to the drawings. In the following drawings, a Cartesian coordinate system of an X-axis, a Y-axis, and a Z-axis is used. Hereinafter, in cases where the positive direction of the X-axis and the negative direction of the X-axis are not particularly distinguished, the positive direction of the X-axis and the negative direction of the X-axis are collectively referred to as the "X direction". In cases where the positive direction of the Y-axis and the negative direction of the Y-axis are not particularly distinguished, the positive direction of the Y-axis and the negative direction of the Y-axis are collectively referred to as the "Y direction". In cases where the positive direction of the Z-axis and the negative direction of the Z-axis are not particularly distinguished, the positive direction of the Z-axis and the negative direction of the Z-axis are collectively referred to as the "Z direction". Hereinafter, a first direction represents the X direction.

Configuration Example of Antenna

Figure 1:
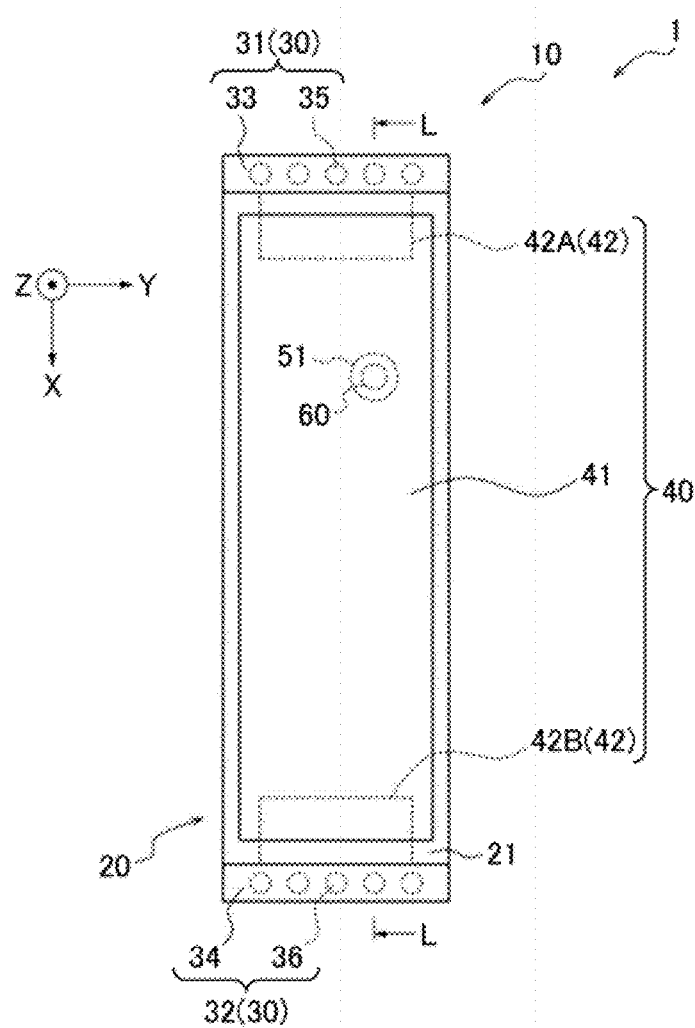
FIG. 1 is a plan view of a resonator of an antenna according to an embodiment of the present disclosure.
Figure 2:
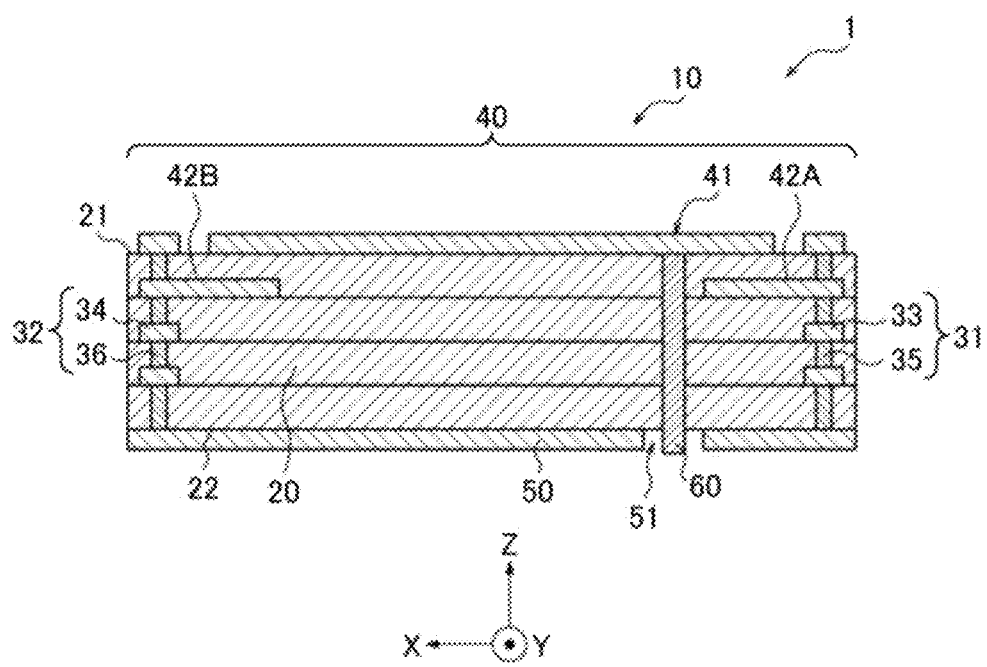
FIG. 2 is a cross-sectional view of the resonator taken along a line L-L illustrated in FIG. 1.
Figure 3:
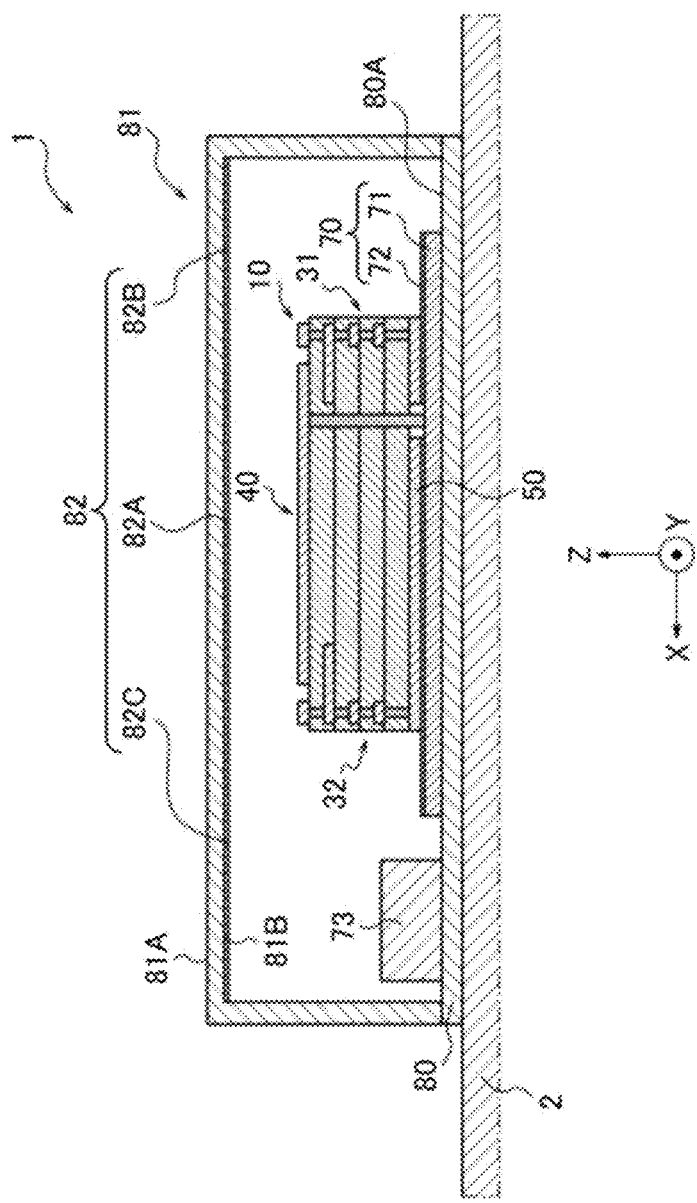
FIG. 3 is a cross-sectional view of the antenna according to the embodiment of the present disclosure.

FIG. 1 is a plan view of a resonator 10 of an antenna 1 according to an embodiment of the present disclosure. FIG. 2 is a cross-sectional view of the resonator 10 taken along a line L-L illustrated in FIG. 1. FIG. 3 is a cross-sectional view of the antenna 1 according to the embodiment of the present disclosure.

The antenna 1 may be disposed on a brake lever 130 and a rear derailleur 140 of a bicycle 100 illustrated in FIG. 5 described below. As illustrated in FIGS. 1 and 2, the antenna 1 includes the resonator 10 and a power supply line 60. As illustrated in FIG. 3, the antenna 1 may include a circuit board 70, a battery 73, a housing 80 and a housing 81, and a secondary emitter 82. The antenna 1 may constitute a wireless communication module with the circuit board 70 and the like.

The resonator 10 may resonate at a plurality of predetermined frequencies. The plurality of predetermined frequencies at which the resonator 10 resonates is also referred to as a plurality of resonant frequencies. One resonant frequency of the plurality of resonant frequencies of the resonator 10 is described as a resonant frequency $f_1$. The wavelength of the resonant frequency $f_1$ is described as a wavelength $\lambda_1$. At least one of the at least one resonant frequencies may be set as the operating frequency of the resonator 10. The resonant frequency $f_1$ may be set as the operating frequency of the resonator 10. A frequency of an identical frequency band to the resonant frequency $f_1$ may be set as the operating frequency of the resonator 10.

The resonator 10, as described below, exhibits an artificial magnetic conductor character with respect to a predetermined frequency of electromagnetic waves incident on a surface of the resonator 10 substantially parallel with an XY plane from the positive Z-axis side. In the present disclosure, "artificial magnetic conductor character" means a characteristic of a surface such that the phase difference between incident waves and reflected waves at a resonant frequency becomes 0 degrees. On the surface having the artificial magnetic conductor character, the phase difference between the incident waves and reflected waves in the operating frequency band ranges from −90 degrees to +90 degrees. The operating frequency band includes a resonant frequency and an operating frequency that exhibit an artificial magnetic conductor character.

As illustrated in FIG. 3, by the resonator 10 exhibiting an artificial magnetic conductor character as described above, the emission efficiency of the antenna 1 can be maintained even when a metal component 2 is positioned on the negative Z-axis side of the resonator 10, i.e., the antenna 1. The metal component 2 may be a portion of the brake lever 130 or the rear derailleur 140 illustrated in FIG. 5 described below. That is, by placing the antenna 1 on the brake lever 130 or the rear derailleur 140 such that the brake lever 130 or the rear derailleur 140 illustrated in FIG. 5 described below is located on the negative Z-axis side of the antenna 1, emission efficiency of the antenna 1 can be maintained.

The resonator 10 includes a base 20, a first conductor 31, a second conductor 32, a third conductor 40, and a fourth conductor 50. The first conductor 31 and the second conductor 32 are also referred to as a conductor pair 30. Each of the first conductor 31, the second conductor 32, the third conductor 40, and the fourth conductor 50 is configured as including an electrically conductive material. Each of the first conductor 31, the second conductor 32, the third conductor 40, and the fourth conductor 50 may include an identical electrically conductive material or may include different conductive materials. Each element, such as the first conductor 31 included in the resonator 10, may be adjusted as appropriate in consideration of the gain of the antenna 1. The resonator 10 may be configured as a flexible printed circuit (FPC).

The base 20 is configured as including a dielectric material. The base 20 may have a discretionary shape that takes into account the first conductor 31 and the like. The dielectric constant of base 20 may be adjusted as appropriate depending on the desired resonant frequency of resonator 10. The base 20 may be roughly a rectangular parallelepiped. As illustrated in FIG. 2, the base 20 includes an upper surface 21 and a lower surface 22. The upper surface 21 is a surface located on the positive Z-axis side, among the two surfaces that are substantially parallel with the XY plane included in the base 20. The lower surface 22 is a surface on the negative Z-axis side, among the two surfaces that are substantially parallel with the XY plane included in the base 20.

The first conductor 31 and the second conductor 32 face one another in the X direction. The first conductor 31 and the second conductor 32 may be located at both end portions in the X direction of the base 20. As illustrated in FIG. 2, the first conductor 31 is electrically connected to an end portion of the fourth conductor 50 on the negative X-axis side. The second conductor 32 is electrically connected to an end portion of the fourth conductor 50 on the positive X-axis side. Each of the first conductor 31 and the second conductor 32 extends along the Z direction from the fourth conductor 50 toward the upper surface 21 of the base 20. The first conductor 31 includes at least one conductor layer 33 and at least one conductor 35. The first conductor 31 can include a plurality of the conductor layers 33. The first conductor 31 can include a plurality of the conductors 35. The second conductor 32 includes at least one conductor layer 34 and at least one conductor 36. The second conductor 32 can include a plurality of the conductor layers 34. The second conductor 32 can include a plurality of the conductors 35.

As illustrated in FIG. 1, the conductor layer 33 and the conductor layer 34 extend along the Y direction. Each of the conductor layer 33 and the conductor layer 34 may extend along the XY plane. As illustrated in FIG. 2, the conductor layer 33 and the conductor layer 34 may have a layer-like form. A portion of the plurality of conductor layers 33 and a portion of the plurality of conductor layers 34 may be located on the upper surface 21 of the base 20. The other portions of the plurality of conductor layers 33 and the other portions of the plurality of conductor layers 34 may be located within the base 20.

The plurality of conductor layers 33 are located at the end portion of the base 20 on the negative X-axis side. The plurality of conductor layers 33 are located separated from one another in the Z direction. Portions of the plurality of conductor layers 33 overlap in the Z direction. The plurality of conductor layers 33 electrically connect the plurality of conductors 35. A portion of the plurality of conductor layers 33 may be electrically connected to any one conductor of the third conductor 40. In the present embodiment, one conductor layer 33 is electrically connected to a second conductor layer 42A included in the third conductor 40. The conductor layer 33 may be integrally formed with the second conductor layer 42A. A portion of the plurality of conductor layers 33 may be electrically connected with the fourth conductor 50. A portion of the plurality of conductor layers 33 may be integrally formed with the fourth conductor 50.

The plurality of conductor layers 34 are located at the end portion of the base 20 on the positive X-axis side. The plurality of conductor layers 34 are located separated from one another in the Z direction. Portions of the plurality of conductor layers 34 overlap in the Z direction. The plurality of conductor layers 34 electrically connect the plurality of conductors 36. A portion of the plurality of conductor layers 34 may be electrically connected to any one conductor of the third conductor 40. In the present embodiment, one conductor layer 34 is electrically connected to a second conductor layer 42B included in the third conductor 40. The conductor layer 34 may be integrally formed with the second conductor layer 42B. A portion of the plurality of conductor layers 34 may be electrically connected with the fourth conductor 50. A portion of the plurality of conductor layers 34 may be integrally formed with the fourth conductor 50.

As illustrated in FIG. 1, the plurality of conductors 35 are aligned, at intervals in the Y direction, at the end portion of the base 20 on the negative X-axis side. Each conductor 35 aligned in the Y direction is electrically connected via at least one conductor layer 33. The plurality of conductors 36 are arranged, at intervals in the Y direction, at the end portion of the base 20 on the positive X-axis side. Each conductor 36 aligned in the Y direction is electrically connected via at least one conductor layer 34. As illustrated in FIG. 2, the plurality of conductors 35 are aligned in the Z direction. Each conductor 35 aligned in the Z direction is electrically connected via at least one conductor layer 33. The plurality of conductors 36 are aligned in the Z direction. Each conductor 36 aligned in the Z direction is electrically connected via at least one conductor layer 34. The distance between the plurality of conductors 35 electrically connected and the distance between the plurality of conductors 36 electrically connected may be equal to or less than one-half of the wavelength $\lambda_1$. If the distance between these is equal to or less than one-half of the wavelength $\lambda_1$, leakage of electromagnetic waves in a predetermined frequency band from each of the first conductor 31 and the second conductor 32 to the outside of the resonator 10 can be reduced. By reducing the leakage of electromagnetic waves in a predetermined frequency band, the first conductor 31 and the second conductor 32 may function better as the electrical walls described below.

As illustrated in FIG. 2, at least a portion of the plurality of conductors 35 and at least a portion of the plurality of conductors 36 are electrically connected to the fourth conductor 50. A portion of the plurality of conductors 35 may electrically connect the fourth conductor 50 and the conductor layer 33. A portion of the plurality of conductors 36 may electrically connect the fourth conductor 50 and the conductor layer 34. The plurality of conductors 35 may be electrically connected to the fourth conductor 50 via the conductor layer 33. The plurality of conductors 36 may be electrically connected to the fourth conductor 50 via the conductor layer 34. Each of the conductor 35 and the conductor 36 may be a via conductor or a through hole conductor.

The third conductor 40 extends along the X direction. The third conductor 40 is configured to capacitively connect the first conductor 31 and the second conductor 32. The third conductor 40 is located between the first conductor 31 and the second conductor 32. By the third conductor 40 being located between the first conductor 31 and the second conductor 32, from the view of the third conductor 40, the first conductor 31 is treated as an electrical wall extending in a YZ plane on the negative X-axis side, and the second conductor 32 is treated as an electrical wall extending in the YZ plane on the positive X-axis side. Moreover, as seen from the third conductor 40, no conductor or the like is disposed on an end on the positive Y-axis side and an end of the third conductor 40 on the negative Y-axis side. In other words, as seen from the third conductor 40, the end of the third conductor 40 on the positive Y-axis side and the end of the third conductor 40 on the negative Y-axis side are electrically open. Because the end of the third conductor 40 on the positive Y-axis side and the end of the third conductor 40 on the negative Y-axis side are electrically open, an XZ plane on the positive Y-axis side and the XZ plane on the negative Y-axis side are treated as magnetic walls from the third conductor 40. The third conductor 40 is surrounded by these two electrical walls and two magnetic walls, thus the resonator 10 exhibits artificial magnetic conductor character with respect to a predetermined frequency of electromagnetic waves incident on the upper surface 21 of the base 20 from the positive Z-axis side.

The third conductor 40 includes at least one first conductor layer 41 and at least one second conductor layer 42. In the present embodiment, the third conductor 40 includes one first conductor layer 41 and two second conductor layers 42, i.e., the second conductor layer 42A and the second conductor layer 42B. The third conductor 40 is also referred to as a conductor group when configured as including a plurality of conductors.

As illustrated in FIG. 1, the first conductor layer 41 extends along the XY plane. First conductor layer 41 may be located on the upper surface 21 of the base 20. The first conductor layer 41 is not electrically connected to the first conductor 31 and the second conductor 32. The first conductor layer 41 may be substantially rectangular.

The first conductor layer 41 is configured to capacitively connect the second conductor layer 42A and the second conductor layer 42B. For example, as illustrated in FIG. 2, an end portion of the first conductor layer 41 on the negative X-axis side faces a portion of the second conductor layer 42A via a portion of the base 20 in the Z direction. The end portion of the first conductor layer 41 in the negative X-axis side is configured to be capacitively connected to the second conductor layer 42A, by facing a portion of the second conductor layer 42A via a portion of the base 20. Also, an end portion of the first conductor layer 41 on the positive X-axis side faces a portion of the second conductor layer 42B via a portion of the base 20 in the Z direction. The end portion of the first conductor layer 41 in the positive X-axis side is configured to be capacitively connected to the second conductor layer 42B, by facing a portion of the second conductor layer 42B via a portion of the base 20.

The second conductor layer 42A and the second conductor layer 42B are configured to be capacitively connected via the first conductor layer 41. The second conductor layer 42A and the second conductor layer 42B are located closer to the fourth conductor 50 than the first conductor layer 41. The second conductor layer 42A and the second conductor layer 42 may be located within the base 20.

As illustrated in FIG. 1, the second conductor layer 42A and the second conductor layer 42B extends along the XY plane. As illustrated in FIG. 2, the second conductor layer 42A is located between the first conductor 31 and the second conductor 32 closer to the first conductor 31. The second conductor layer 42A is electrically connected to the conductor layer 33 of the first conductor 31. The second conductor layer 42B is located between the first conductor 31 and the second conductor 32 closer to the second conductor 32. The second conductor layer 42B is electrically connected to the conductor 36 of the second conductor 32.

The fourth conductor 50 is electrically connected to the first conductor 31 and the second conductor 32. The fourth conductor 50 may have a layer-like form. The fourth conductor 50 is located on the lower surface 22 of the base 20. A portion of the fourth conductor 50 may be located within the base 20. The fourth conductor 50 may include an opening 51.

The fourth conductor 50 is located separated from the third conductor 40. The fourth conductor 50 may face the third conductor 40. The fourth conductor 50 may extend along the third conductor 40. The fourth conductor 50 may extend along the X direction. The fourth conductor 50 may extend along the XY plane.

The electric potential of the fourth conductor 50 may be equivalent to the reference potential of the electronic device provided with the antenna 1. The fourth conductor 50 may be electrically connected to the ground of the electronic device provided with the antenna 1.

The power supply line 60 is electrically connected to the third conductor 40. In the present disclosure, an "electromagnetic connection" may be an electrical connection or a magnetic connection. In the present embodiment, one end of the power supply line 60 is electrically connected to the first conductor layer 41 of the third conductor 40. The other end of the power supply line 60 is electrically connected to an RF module or the like via the opening 51 of the fourth conductor 50 via the circuit board 70 illustrated in FIG. 3. A portion of the power supply line 60 is located within the base 20. The power supply line 60 may extend along the Z direction. The power supply line 60 may be a through hole conductor, a via conductor, or the like.

The power supply line 60 is configured to supply electrical power from the RF module or the like to the third conductor 40 via the circuit board 70 illustrated in FIG. 3 when the antenna 1 emits electromagnetic waves by the resonator 10. The power supply line 60 is configured to supply electrical power from the third conductor 40 to the RF module or the like via the circuit board 70 illustrated in FIG. 3 when the antenna 1 receives electromagnetic waves by the resonator 10.

As illustrated in FIG. 3, the resonator 10 may be located on the circuit board 70. In a case where the antenna 1 does not include the circuit board 70 and the housing 81, the resonator 10 may be disposed directly on the metal component 2. The circuit board 70 may be configured as a Printed Circuit Board (PCB) or may be configured as an FPC. The circuit board 70 includes an insulation substrate 71 and a conductor layer 72. The insulation substrate 71 is substantially parallel to the XY plane. The conductor layer 72 is located on the surface on the positive Z-axis side of the two surfaces that are substantially parallel with the XY plane included in the insulation substrate 71. The conductor layer 72 is also referred to as a ground layer. The conductor layer 72 may be integrally formed with the fourth conductor 50 of the resonator 10.

The battery 73 is configured to be able to supply electrical power to components of the antenna 1 as a wireless communication module. The battery 73 may include at least one of a primary battery or a secondary battery. The negative pole of the battery 73 may be electrically connected to the conductor layer 72 as a ground layer of the circuit board 70. The negative pole of the battery 73 may be electrically connected to the fourth conductor 50 of the resonator 10.

The housing 80 and the housing 81 may protect various components of a wireless communication module that includes the antenna 1. Examples of components of a wireless communication module that includes the antenna 1 may include the resonator 10, the circuit board 70, the battery 73, and the like. The housing 80 and the housing 81 may be made of a discretionary material such as a dielectric material or an electrically conductive material.

The housing 80 may expand along the XY plane. The housing 80 may have a flat plate shape substantially parallel to the XY plane. The housing 80 supports various components of the antenna 1. The housing 80 may support the resonator 10, the circuit board 70, and the battery 73. The housing 80 includes an upper surface 80A. The upper surface 80A is a surface located on the positive Z-axis side, among the two surfaces that are substantially parallel with the XY plane of the housing 80. The circuit board 70 and the battery 73 may be aligned in the X direction on the upper surface 80A.

The housing 81 may cover various components of the antenna 1. The housing 81 includes an upper surface 81A and a lower surface 81B. The upper surface 81A is a surface facing an opposite side of the resonator 10, among the surfaces of the housing 81. The upper surface 81B is a surface facing the resonator 10, among the surfaces of the housing 81. The upper surface 81A and the lower surface 81B may extend along the XY plane. The upper surface 81A and the lower surface 81B may be substantially parallel with the XY plane. The upper surface 81A and the lower surface 81B may be flat. The upper surface 81A and the lower surface 81B are not limited to being flat and may include recesses and protrusions.

The secondary emitter 82 may include an electrically conductive material. The secondary emitter 82 is located on the lower surface 81B of the housing 81. However, the secondary emitter 82 may be located anywhere on the housing 81. For example, the secondary emitter 82 may be located on the upper surface 81A. For example, secondary emitter 82 may be located inside the housing 81 on a side surface thereof or may be located on an exterior side surface of the housing 81. For example, the secondary emitter 82 may be embedded within the housing 81.

Figure 4:
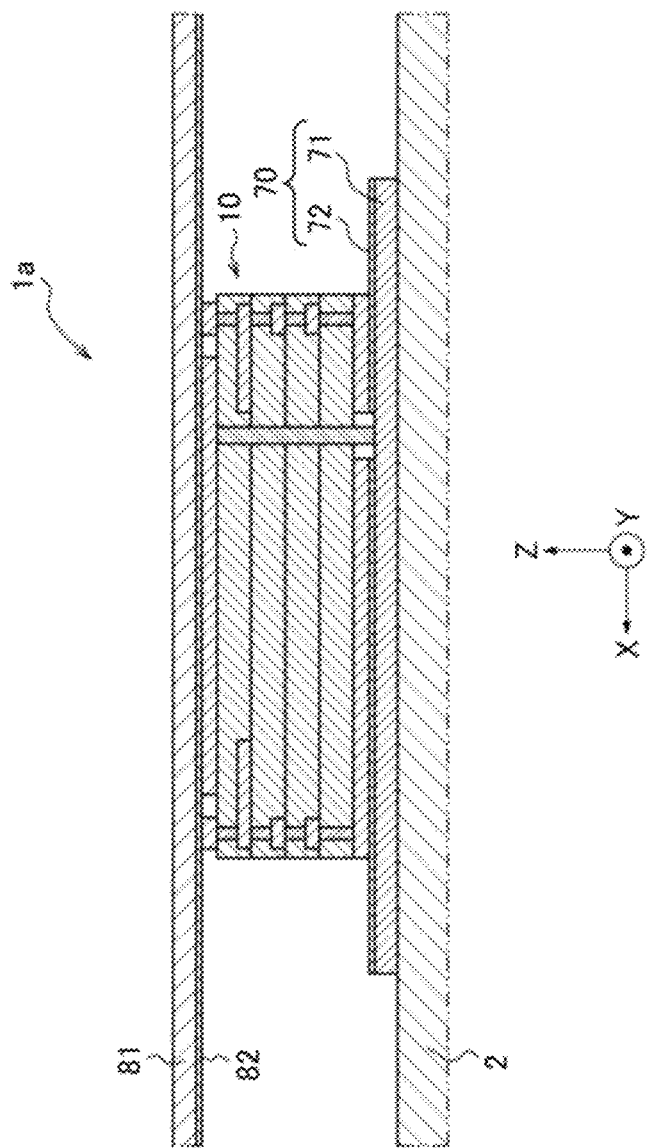
FIG. 4 is a cross-sectional view of an antenna according to another embodiment of the present disclosure.

The secondary emitter 82 faces the resonator 10. The secondary emitter 82 may face the third conductor 40 of the resonator 10. A portion of the secondary emitter 82 may face the battery 73. The secondary emitter 82 is separated from the resonator 10. That is, the secondary emitter 82 is not electrically connected to the conductors of the resonator 10. However, as illustrated in FIG. 4, the secondary emitter 82 may come into contact with the resonator 10. FIG. 4 is a cross-sectional view of an antenna 1a according to another embodiment of the present disclosure. In the configuration illustrated in FIG. 4, the secondary emitter 82 may be integrally formed with the resonator 10.

The secondary emitter 82 includes a first portion 82A. The first portion 82A faces the resonator 10 in the Z direction. The first portion 82A may overlap the third conductor 40 of the resonator 10 in the Z direction. In addition to the first portion 82A, the secondary emitter 82 may include at least a second portion that faces the resonator 10 in the X direction and a third portion that faces the resonator 10 in the Y direction.

The secondary emitter 82 may include a first extension portion 82B and a second extension portion 82C. The first extension portion 82B extends more toward the negative X-axis side than the first conductor 31 of the resonator 10 in the X direction. The second extension portion 82C extends more toward the positive X-axis side than the second conductor 32 of the resonator 10 in the X direction. Each of the first extension portion 82B and the second extension portion 82C may be electrically connected to the first portion 82A. The second extension portion 82C may face the battery 73 in the Z direction. The second extension portion 82C may be configured to capacitively connect with the battery 73. That is, the second extension portion 82C, the battery 73, and the space between the second extension portion 82C and the battery 73 may be configured to give rise to capacitance. Because the secondary emitter 82 includes the first extension portion 82B and the second extension portion 82C, the antenna 1 may increase the gain in air.

The secondary emitter 82 is configured to electromagnetically connect to any conductor included in the resonator 10. The first portion 82A of the secondary emitter 82 may be configured to electromagnetically connect to the resonator 10. As described above, the first portion 82A may overlap the third conductor 40 of the resonator 10 in the Z direction. Overlapping the first portion 82A and the third conductor 40 of the resonator 10 can increase the propagation of the electromagnetic waves from the electromagnetic connection between the secondary emitter 82 and the third conductor 40. The electromagnetic connection between the secondary emitter 82 and the third conductor 40 can be mutual inductance. The secondary emitter 82 may be configured to electromagnetically connect to the fourth conductor 50 included in the resonator 10.

The secondary emitter 82 may extend along the X direction. The secondary emitter 82 may extend along the XY plane. The length of the secondary emitter 82 in the X direction may be greater than the length of the resonator 10 in the X direction. The length of the secondary emitter 82 may be greater than one-half of the wavelength $\lambda_1$. The secondary emitter 82 may include a portion that extends along the Y direction. The secondary emitter 82 may bend in the XY plane. The secondary emitter 82 may include a portion that extends along the Z direction. The secondary emitter 82 may bend from the XY plane toward the YZ plane or from the XY plane toward the XZ plane.

In the antenna 1 provided with the secondary emitter 82, the resonator 10 and the secondary emitter 82 are configured to electromagnetically connect to one another. The operating frequency of the antenna 1 in a configuration in which the resonator 10 and the secondary emitter 82 are electromagnetically connected will be described as an operating frequency $f_c$. The operating frequency $f_c$ of the antenna 1 may be different from the resonant frequency $f_1$ of the resonator 10. The operating frequency $f_c$ of the antenna 1 may be closer to the resonant frequency $f_1$ of the resonator 10 than the resonant frequency of the secondary emitter 82. The operating frequency $f_c$ of the antenna 1 may be within the resonant frequency band of the resonator 10. The operating frequency $f_c$ of the antenna 1 may be outside the resonant frequency band of the secondary emitter 82.

Configuration Example of Bicycle

Figure 5:
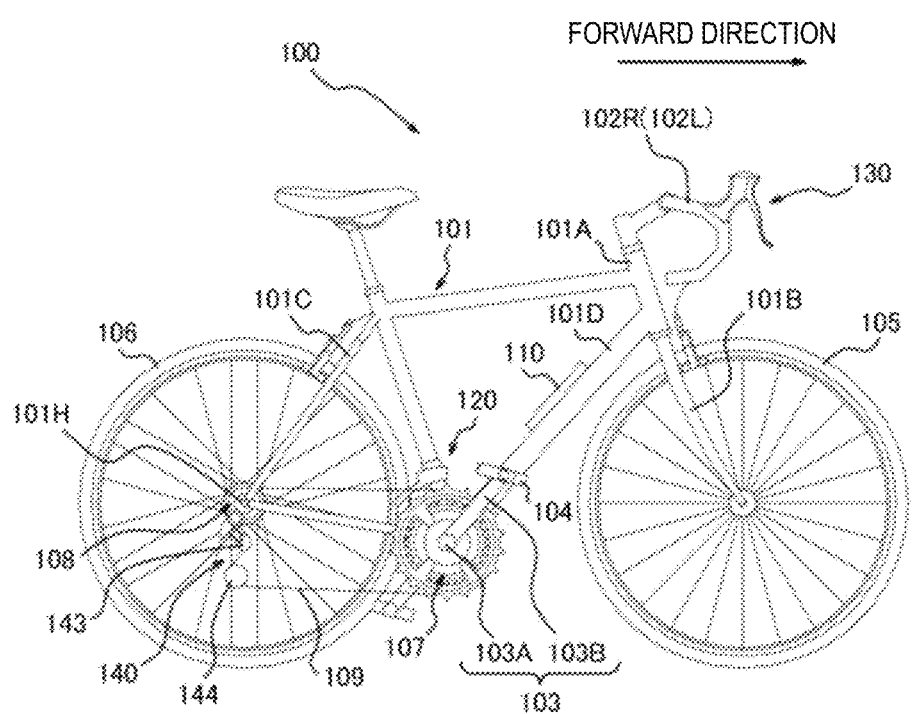
FIG. 5 is an external view of a bicycle according to an embodiment of the present disclosure.

FIG. 5 is an external view of the bicycle 100 according to an embodiment of the present disclosure. The bicycle 100 may be human-powered. However, the "bicycle" of the present disclosure is not limited to a bicycle that is only human-powered. The "bicycle" of the present disclosure is only required to include a handlebar and a wheel. For example, the "bicycle" of the present disclosure may include a power assist electric bike, an electric bicycle, and a two-wheel drive bicycle. The "bicycle" of the present disclosure is not limited to a two-wheeled vehicle. For example, a "bicycle" may include a single-wheeled vehicle, a three-wheeled vehicle, and a four-wheeled vehicle. Note that the classification of "bicycle" is not limited to those described above. For example, a "bicycle" may include a tandem bicycle.

The bicycle 100 includes a frame 101, a handlebar 102R, a handlebar 102L, a crank 103, a pedal 104, a front wheel 105, a rear wheel 106, a front sprocket 107, a rear sprocket 108, and a chain 109. The bicycle 100 includes a battery 110, a front derailleur 120, the brake lever 130, and the rear derailleur 140 (transmission).

The frame 101 may include an electrically conductive material or carbon fiber reinforced plastic. The frame 101 supports various elements of the bicycle 100. The frame 101 includes a head tube 101A, a front fork 101B, a seat stay 101C, a down tube 101D, and a rear fork end 101H.

The handlebar 102R and the handlebar 102L are configured to be attachable to the head tube 101A via a stem. The handlebar 102R is located on the right side of the driver. The driver may grasp the handlebar 102R with the right hand. The handlebar 102L is located on the left side of the driver. The driver may grasp the handlebar 102L with the left hand.

The crank 103 includes a crankshaft 103A and an arm 103B. The pedal 104 is attached to the arm 103B. The driver rotates the pedal 104 by the foot. The driver applies a driving force to the pedal 104 by rotating the pedal 104. The driving force applied to the pedal 104 is transmitted to the rear wheel 106 via the crank 103 and the like.

The front wheel 105 and the rear wheel 106 are each configured as including a tire, a rim, a hub, and the like. The front wheel 105 is attached to an end portion of the front fork 101B of the frame 101. The rear wheel 106 is attached to an end portion of the seat stay 101C of the frame 101. A driving force from the pedal 104 is transmitted to the rear wheel 106 via the crank 103, the front sprocket 107, the rear sprocket 108, and the chain 109. The rear wheel 106 is configured to be rotated by the driving force transmitted from the pedal 104.

The front sprocket 107 is configured as including a plurality of sprockets (gears). The front sprocket 107 is attached in a manner such that it rotates integrally with the crankshaft 3A of the crank 103. The chain 109 is wound by the front derailleur 120 onto any one of the plurality of sprockets of the front sprocket 107.

The rear sprocket 108 is configured as including a plurality of sprockets (gears). The rear sprocket 108 is attached to the hub of the rear wheel 106. The chain 109 is wound by the rear derailleur 140 onto any one of the plurality of sprockets of the rear sprocket 108.

The chain 109 is wound around the front sprocket 107 and the rear sprocket 108. A gear ratio is determined on the basis of a sprocket, from the plurality of sprockets of the front sprocket 107, onto which the chain 109 is wound and a sprocket, from the plurality of sprockets of the rear sprocket 108, onto which the chain 109 is wound.

The battery 110 may include a lithium ion battery, a nickel hydrogen battery, or the like. The battery 110 is attached to the down tube 101D of the frame 101. The battery 110 is capable of supplying power to the components of the bicycle 100. The components of the bicycle 100 to which the battery 110 is capable of supplying power to may include the front derailleur 120, the brake lever 130, the rear derailleur 140, and the like.

The front derailleur 120 is configured to move the chain 109 between the plurality of sprockets of the front sprocket 107 on the basis of the operation of the driver. The front derailleur 120 may be configured to move the chain 109 on the basis of the operation of the driver with respect to the brake lever 130 on the left, described below.

The brake lever 130 is attachable to either the handlebar 102R or the handlebar 102L. Hereinafter, the brake lever 130 that is attachable to the handlebar 102R will be described as the "right brake lever 130". The brake lever 130 that is attachable to the handlebar 102L will be described as the "left brake lever 130".

In a case where the brake lever 130 is the right brake lever 130, the brake lever 130 is configured to detect the operation of the driver with respect to the brake of the front wheel 105. Also, in a case where the brake lever 130 is the left brake lever 130, the brake lever 130 is configured to detect the operation of the driver with respect to the brake of the rear wheel 106. However, the right brake lever 130 may be configured to detect the operation of the driver with respect to the brake of the rear wheel 106, and the left brake lever 130 may be configured to detect the operation of the driver with respect to the brake of the front wheel 105.

In a case where the brake lever 130 is the right brake lever 130, the brake lever 130 is configured to detect the operation of the driver with respect to the rear derailleur 140. That is, the right brake lever 130 is associated with the rear derailleur 140. Also, in a case where the brake lever 130 is the left brake lever 130, the brake lever 130 is configured to detect the operation of the driver with respect to the front derailleur 120. That is, the left brake lever 130 is associated with the front derailleur 120. However, the right brake lever 130 may be configured to detect the operation of the driver with respect to the front derailleur 120, and the left brake lever 130 may be configured to detect the operation of the driver with respect to the rear derailleur 140. Note that in a case where the brake lever 130 is configured to detect the operation of the driver with respect to both the rear derailleur 140 and the front derailleur 120, the brake lever 130 may also be referred to as a dual control lever.

The brake lever 130 will be described in detail below. In the description below, the brake lever 130 is the right brake lever 130.

Configuration Example of Brake Lever

Figure 6:
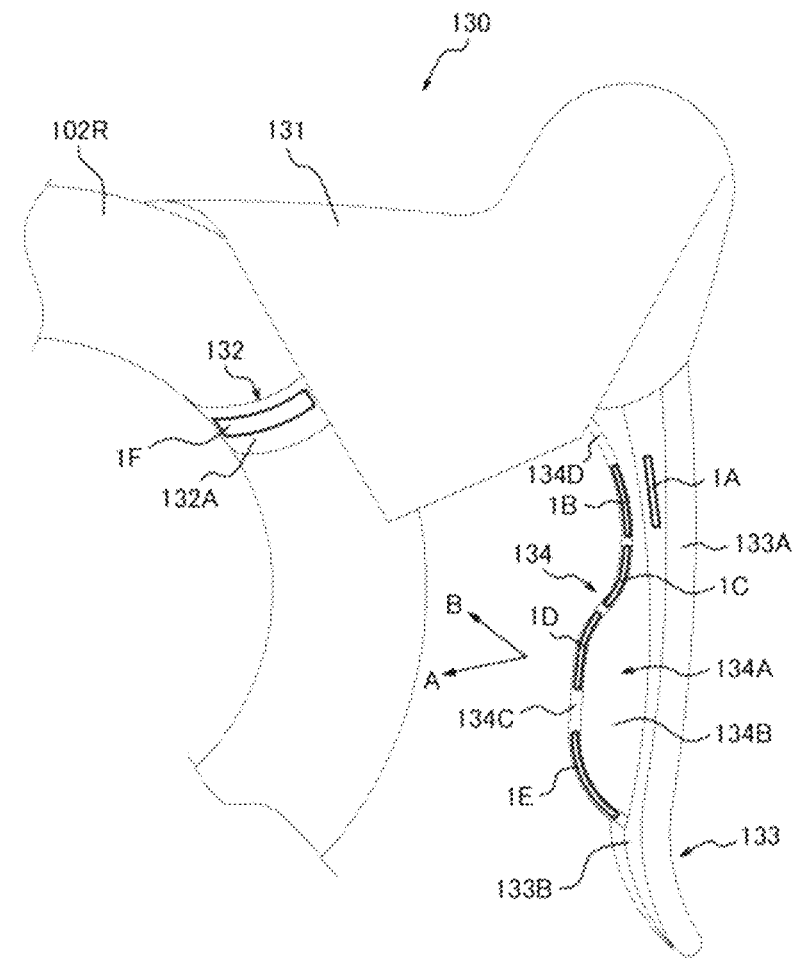
FIG. 6 is a configuration diagram of a brake lever illustrated in FIG. 5.

FIG. 6 is a configuration diagram of the brake lever 130 illustrated in FIG. 5. The brake lever 130 includes a body portion 131, a clamp portion 132 (long portion), a first lever member 133 (long portion), and a second lever member 134.

A metal component and the like for attaching the first lever member 133 and the second lever member 134 to the body portion 131 are housed inside the body portion 131. The body portion 131 includes a cover member that covers the metal components and the like. The clamp portion 132 is located on one end of the body portion 131. At the other end of the body portion 131, the first lever member 133 and the second lever member 134 are located.

The clamp portion 132 is configured as including an electrically conductive material. The clamp portion 132 is capable of clamping the handlebar 102R. The clamp portion 132 clamps the handlebar 102R such that the brake lever 130 is secured to the handlebar 102R. The clamp portion 132 may be ring-shaped. The clamp portion 132 may be an elliptical ring shape or a circular ring shape depending on the outer circumference of the handlebar 102R. The clamp portion 132 includes an outer surface 132A. The outer surface 132A is a surface facing the outer side of the ring-shaped clamp portion 132, among the outer surfaces of the ring-shaped clamp portion 132.

The first lever member 133 is configured as including an electrically conductive material. The first lever member 133 extends from the body portion 131 toward the front wheel 105 of the bicycle 100. The first lever member 133 includes an outer surface 133A and an outer surface 133B. The outer surface 133A is a surface facing an opposite side of the clamp portion 132, among the outer surfaces of the first lever member 133. The outer surface 133A may be an outwardly curved surface that protrudes to the opposite side of the clamp portion 132. The outer surface 133B is a surface facing the clamp portion 132, among the outer surfaces of the first lever member 133. The outer surface 133B may be an inwardly curved surface that recesses to the opposite side of the clamp portion 132.

The first lever member 133 is movably attached to the body portion 131. The first lever member 133 may move in a direction A. The direction A is the direction from the first lever member 133 toward the clamp portion 132. The first lever member 133 is configured to move in the direction A when a force directed toward the direction A is applied to the outer surface of the first lever member 133. The first lever member 133 is configured to return to a predetermined position when the force applied to the outer surface of the first lever member 133 is released. The first lever member 133 may move in a direction B. The direction B is the direction from the right side to the left side when the driver views the first lever member 133. The first lever member 133 is configured to move in the direction B when a force directed toward the direction B is applied to the outer surface of the first lever member 133. The first lever member 133 is configured to return to a predetermined position when the force applied to the outer surface of the first lever member 133 is released.

The second lever member 134 may include a discretionary material such as a resin material. The second lever member 134 is located closer to the clamp portion 132 than the first lever member 133. The length of the second lever member 134 is less than the length of the first lever member 133. The second lever member 134 includes a plate-like portion 134A and a connection portion 134D. The plate-like portion 134A may have a discretionary shape. The plate-like portion 134A may be substantially rectangular or may be substantially triangular. The plate-like portion 134A includes an outer surface 134B and a side surface 134C. The outer surface 134B is an outer surface on the right side when viewed from the driver, among the outer surfaces of the plate-like portion 134A. The side surface 134C is a surface facing the clamp portion 132, among the side surfaces of the plate-like portion 134A. In other words, the side surface 134C is the surface facing an opposite side of the first lever member 133, among the side surfaces of the plate-like portion 134A. The connection portion 134D connects the body portion 131 and the plate-like portion 134A. The connection portion 134D may be rod-shaped.

The second lever member 134 is movably attached to the body portion 131. The second lever member 134 may move in the direction B. The second lever member 134 is configured to move in the direction B when a force directed toward the direction B is applied to the plate-like portion 134A. The second lever member 134 is configured to return to a predetermined position when the force applied to the plate-like portion 134A is released.

The driver operates the first lever member 133 and the second lever member 134 on the basis of the specifications of the first lever member 133 and the second lever member 134.

In the present embodiment, in the specifications of the first lever member 133, the front wheel 105 is configured to brake when the first lever member 133 is moved in the direction A. As such, the driver moves the first lever member 133 toward the direction A when they desire to decelerate the rotation of the front wheel 105 by braking. When the driver desires to release the brake on the front wheel 105, the driver returns the first lever member 133 to the predetermined position.

In the present embodiment, in the specifications of the second lever member 134, the rear derailleur 140 is configured to shift up a gear when the second lever member 134 is moved in the direction B. In the present embodiment, in the specifications of the first lever member 133, the rear derailleur 140 is configured to shift down a gear when the first lever member 133 is moved in the direction B. As such, the driver moves the second lever member 134 toward the direction B when they desire to shift the rear derailleur 140 up a gear. The driver moves the first lever member 133 toward the direction B when they desire to shift the rear derailleur 140 down a gear.

When operating the first lever member 133, the driver hooks their right thumb around the handlebar 102R and places their right index finger or the like on the outer surface 133A. When the driver moves the first lever member 133 toward the direction A, the right index finger or the like on the outer surface 133A is brought closer to the right thumb hooked around the handlebar 102R, applying a force directed in the direction A on the outer surface 133A. When the driver moves the first lever member 133 toward the direction B, the right index finger or the like on the outer surface 133A moves in the direction B, applying a force directed in the direction B on the outer surface 133A.

In this manner, in the first lever member 133, the outer surface 133A can be a surface with a relatively high probability of being touched by the driver among the outer surfaces of the first lever member 133 when the driver operates the first lever member 133. In contrast, the outer surface 133B is located on the opposite side to the outer surface 133A that the driver puts their finger on. As such, the outer surface 133B can be a surface with a relatively low probability of being touched by the driver among the outer surfaces of the first lever member 133 when the driver operates the first lever member 133.

When operating the second lever member 134, the driver hooks their right thumb around the handlebar 102R and places their right index finger or the like on the outer surface 134B of the plate-like portion 134A. When the driver moves the second lever member 134 toward the direction B, the right index finger or the like on the outer surface 134B moves in the direction B, applying a force directed in the direction B on the plate-like portion 134A of the second lever member 134.

In this manner, in the second lever member 134, the outer surface 134B can be a surface with a relatively high probability of being touched by the driver among the outer surfaces of the second lever member 134 when the driver operates the second lever member 134. In contrast, the side surface 134C may be a surface with a relatively low probability of being touched by the driver among the outer surfaces of the second lever member 134. Also, the connection portion 134D may be a portion with a relatively low probability of being touched by the driver.

As illustrated in FIG. 6, the brake lever 130 according to the present embodiment may include at least one of antennas 1A, 1B, 1C, 1D, 1E, or 1F. The antennas 1A to 1F may be disposed at a section of the brake lever 130 with a low probability of being touched by the driver. By at least one of the antennas 1A to 1F being provided, the brake lever 130 can be given a wireless communication function. The brake lever 130 with a wireless communication function may be capable of communicating with the rear derailleur 140 with a wireless communication function. In this case, the antennas 1A to 1F may be disposed on the brake lever 130 at a section facing the rear derailleur 140, i.e., the communication partner. The antennas 1A to 1F have an identical configuration to the antenna 1 illustrated in FIG. 1 or the antenna 1a illustrated in FIG. 4. In other words, the antennas 1A to 1F include the first conductor 31, the second conductor 32, the third conductor 40, the fourth conductor 50, and the power supply line 60.

The antenna 1A may be disposed on the brake lever 130 with the fourth conductor 50 facing the first lever member 133 as a long portion. The antenna 1A may be disposed directly on the first lever member 133. In a case where the antenna 1A is disposed directly on the first lever member 133, the first lever member 133 may correspond to the metal component 2 illustrated in FIG. 3 or FIG. 4. In a case where the antenna 1A is not provided with the circuit board 70 and the housing 80 illustrated in FIGS. 3 and 4, the fourth conductor 50 may be disposed on the first lever member 133 in direct contact with the first lever member 133, i.e., the metal component 2. By disposing the antenna 1A with the fourth conductor 50 facing the first lever member 133, the first lever member 133 including the electrically conductive material may be located on the negative Z-axis side as illustrated in FIG. 1 and the like of the antenna 1A. As described above, in a configuration in which the metal component 2 is located on the negative Z-axis side of the antenna 1A, the emission efficiency of the antenna 1A can be maintained. That is, by disposing the antenna 1A with the fourth conductor 50 facing the first lever member 133, the emission efficiency of the antenna 1A can be maintained.

The antenna 1A may be disposed on the first lever member 133 such that the X direction illustrated in FIG. 1 and the like is aligned with the direction in which the first lever member 133 as a long portion extends. The antenna 1A may be configured such that the fourth conductor 50 of the antenna 1A and the first lever member 133 are capacitively connected by the antenna 1 being disposed on the first lever member 133 such that the X direction illustrated in FIG. 1 and the like is aligned with the direction in which the first lever member 133 extends. The fourth conductor 50 of the antenna 1A and the first lever member 133 are capacitively connected such that when the antenna 1A emits electromagnetic waves, a current can be induced in the first lever member 133. The current induced in the first lever member 133 may cause the first lever member 133 to emit electromagnetic waves. By causing the first lever member 133 to emit electromagnetic waves via a current induced in the first lever member 133, the overall emission efficiency of the antenna 1A when emitting electromagnetic waves can be improved.

Antenna 1A may be configured to be able to be attached to the bicycle 100 with the X direction illustrated in FIG. 1 and the like aligned with the forward direction of the bicycle 100. As illustrated in FIG. 5, the forward direction of the bicycle 100 is a direction in which the bicycle 100 can travel forward when the handlebars 102R, 102L of the bicycle 100 are set straight. In a case where the antenna 1A is attached aligned with the forward direction of the bicycle 100, the damping caused when the electromagnetic waves emitted from the antenna 1A are reflected off the ground can be increased. Compared to a case where the antenna 1A is attached with the X direction illustrated in FIG. 1 and the like aligned with a turning direction of the bicycle 100, when the X direction illustrated in FIG. 1 and the like is aligned with the forward direction of the bicycle 100, the damping caused when the electromagnetic waves emitted from the antenna 1A are reflected off the ground can be increased. The turning direction of the bicycle is a direction in which the bicycle 100 can travel forward when the handlebars 102R, 102L of the bicycle 100 are turned to the left or right. With this configuration, the antenna 1A can reduce the interference to direct waves by reflected waves.

The antenna 1A may be disposed on the outer surface 133B among the outer surfaces of the first lever member 133. As described above, the outer surface 133B can be a surface with a relatively low probability of being touched by the driver among the outer surfaces of the first lever member 133 when the driver operates the first lever member 133. By the antenna 1A being located on the outer surface 133B, the probability of the driver touching the antenna 1A may be reduced. By reducing the probability of the driver touching the antenna 1A, the probability that the antenna 1A fails due to the driver touching the antenna 1A can be reduced.

In a case where the antenna 1A does not include the secondary emitter 82 illustrated in FIGS. 3 and 4, the antenna 1A may be disposed such that the third conductor 40 faces the rear derailleur 140, i.e., the communication partner. Also, in a case where the antenna 1A includes the secondary emitter 82 illustrated in FIGS. 3 and 4, the antenna 1A may be disposed such that the emission direction of the secondary emitter 82 faces the rear derailleur 140, i.e., the communication partner. In other words, the antenna 1A may be disposed such that the positive direction of the Z-axis illustrated in FIGS. 3 and 4 is aligned with the direction from the first lever member 133 toward the rear derailleur 140. By the third conductor 40 or the secondary emitter 82 emitting electromagnetic waves facing the rear derailleur 140, communication efficiency between the antenna 1A and the rear derailleur 140 as a communication partner can be improved.

The antennas 1B to 1E are located on the second lever member 134. The antennas 1B to 1E are disposed on the second lever member 134 such that the fourth conductor 50 of the antennas 1B to 1E faces the first lever member 133 as a long portion. In a similar manner to the antenna 1A, by disposing the antennas 1B to 1E with the fourth conductor 50 of the antennas 1B to 1E facing the first lever member 133, the emission efficiency of the antennas 1B to 1E can be maintained. In a similar manner to the antenna 1A described above, in a case where each of the antennas 1B to 1E does not include the secondary emitter 82 illustrated in FIGS. 3 and 4, the antennas 1B to 1E may be disposed such that the third conductor 40 faces the rear derailleur 140, i.e., the communication partner. In a similar manner to the antenna 1A, in a case where each of the antennas 1B to 1E includes the secondary emitter 82 illustrated in FIGS. 3 and 4, the antennas 1B to 1E may be disposed such that the emission direction of the secondary emitter 82 faces the rear derailleur 140, i.e., the communication partner. Such a configuration may improve the communication efficiency between the antennas 1E to 1E and the rear derailleur 140 as a communication partner.

The antennas 1B to 1E may be constituted of an FPC. Here, the outer surface and the like of the second lever member 134 may include curved sections. By the antennas 1B to 1E being constituted of an FPC, a curved section can be more easily disposed on each of the antennas 1B to 1E.

The antenna 1B is disposed on the connection portion 134D of the second lever member 134. As described above, the connection portion 134D may be a portion with a relatively low probability of being touched by the driver. By disposing the antenna 1B on the connection portion 134D, the probability that the antenna 1B fails due to the driver touching the antenna 1B can be reduced. The antenna 1B may be disposed on the second lever member 134 such that the X direction illustrated in FIG. 1 and the like is aligned with the direction in which the first lever member 133 extends. This can improve the overall emission efficiency of the antenna 1B when emitting electromagnetic waves.

The antenna 1C is disposed spanning from the connection portion 134D to the side surface 134C of the plate-like portion 134A. As described above, the connection portion 134D and the side surface 134C may be a portion or surface with a relatively low probability of being touched by the driver. By disposing the antenna 1C spanning from the connection portion 134D to the side surface 134C, the probability that the antenna 1C fails due to the driver touching the antenna 1C can be reduced.

The antennas 1D, 1E are disposed on the side surface 134C of the plate-like portion 134A. As described above, the side surface 134C may be a surface with a relatively low probability of being touched by the driver. As described above, by disposing the antennas 1D, 1E on the side surface 134C, the probability that the antennas 1D, 1E fail due to the driver touching the antennas 1D, 1E can be reduced.

The antenna 1F may be disposed on the brake lever 130 with the fourth conductor 50 facing the clamp portion 132 as a long portion. The antenna 1F may be disposed on the outer surface 132A of the ring-shaped clamp portion 132. In a case where the antenna 1F is disposed on the clamp portion 132, the clamp portion 132 may correspond to the metal component 2 illustrated in FIG. 3 or FIG. 4. In a case where the antenna 1F is not provided with the circuit board 70 and the housing 80 illustrated in FIGS. 3 and 4, the fourth conductor 50 may be disposed on the clamp portion 132 in direct contact with the clamp portion 132, i.e., the metal component 2. In a similar manner to the antenna 1A, by disposing the antenna 1F with the fourth conductor 50 of the antenna 1F facing the clamp portion 132, the emission efficiency of the antenna 1F can be maintained. The clamp portion 132 has a low probability of being touched by the driver. By disposing the antenna 1F on the clamp portion 132, the probability that the antenna 1F fails due to the driver touching the antenna 1F can be reduced. The antenna 1F may be constituted of an FPC. By the antenna 1F being constituted of an FPC, the antenna 1F can be more easily disposed on the ring-shaped clamp portion 132.

The antenna 1F may be disposed on the clamp portion 132 with the X direction illustrated in FIG. 1 and the like aligned with the circumferential direction of the ring-shaped clamp portion 132. With such a configuration, similar to the antenna 1A, the overall emission efficiency of the antenna 1F can be improved. In a similar manner to the antenna 1A, in a case where the antenna 1F does not include the secondary emitter 82 illustrated in FIGS. 3 and 4, the antenna 1F may be disposed such that the third conductor 40 faces the rear derailleur 140, i.e., the communication partner. In a similar manner to the antenna 1A, in a case where the antenna 1F includes the secondary emitter 82 illustrated in FIGS. 3 and 4, the antenna 1F may be disposed such that the emission direction of the secondary emitter 82 faces the rear derailleur 140, i.e., the communication partner. Such a configuration may improve the communication efficiency between the antenna 1F and the rear derailleur 140.

Figure 7:
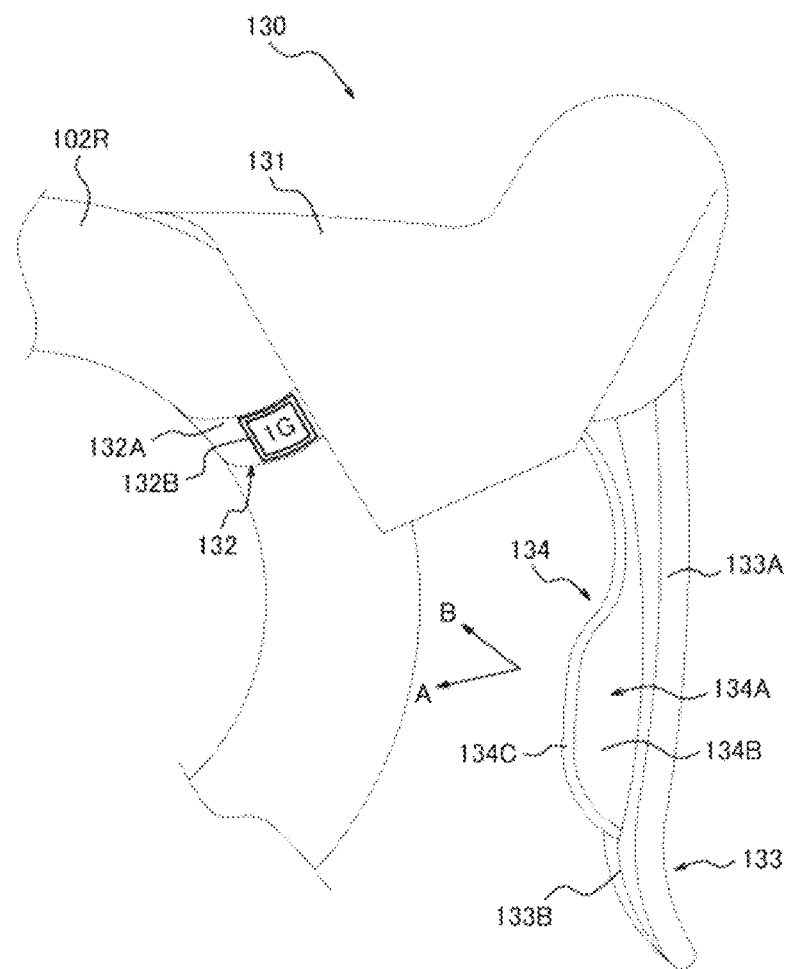
FIG. 7 is a diagram illustrating another position of an antenna on the brake lever illustrated in FIG. 5.

FIG. 7 is a diagram illustrating another position of an antenna on the brake lever 130 illustrated in FIG. 5. An antenna 1G has an identical configuration to the antenna 1 illustrated in FIG. 1 or the antenna 1a illustrated in FIG. 4 in a similar manner to the antennas 1A to 1F. In other words, the antenna 1G includes the first conductor 31, the second conductor 32, the third conductor 40, the fourth conductor 50, and the power supply line 60.

The antenna 1G is disposed on a substrate 132B. Similar to the antenna 1F, the fourth conductor 50 of the antenna 1G faces the clamp portion 132 as a long portion. The substrate 132B may include an electrically conductive material, or may be formed from a discretionary material such as a resin material. The position of the substrate 132B at the clamp portion 132 may be adjusted as appropriate depending on the communication partner of the antenna 1G. The other configurations of the antenna 1G are similar to that of the antenna 1F illustrated in FIG. 6.

Configuration Example of Rear Derailleur

Figure 8:
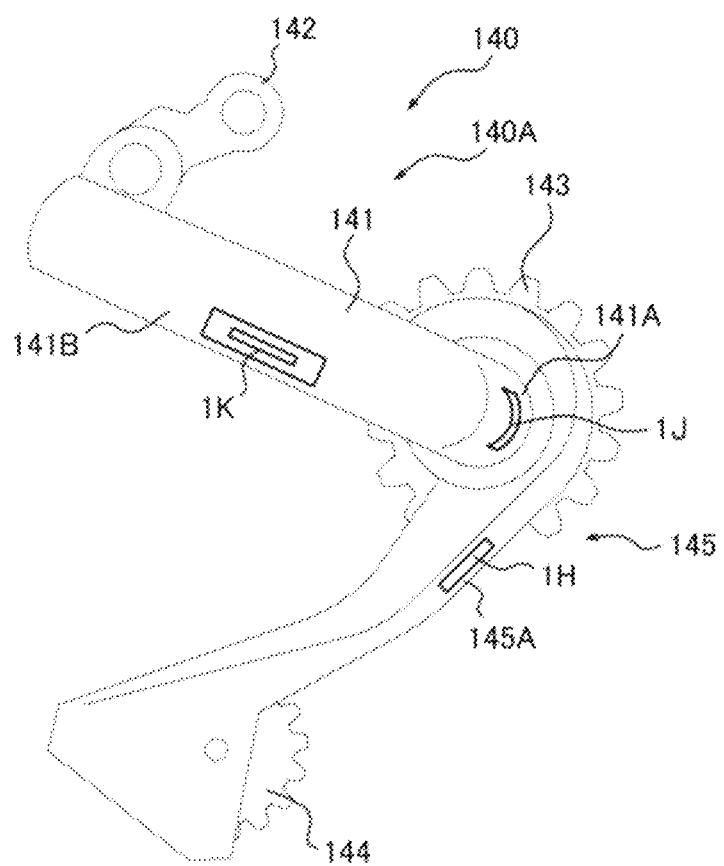
FIG. 8 is a configuration diagram of a rear derailleur illustrated in FIG. 5.

FIG. 8 is a configuration diagram of the rear derailleur 140 illustrated in FIG. 5. The rear derailleur 140 is configured to be attachable at or near the rear fork end 101H of the frame 101 illustrated in FIG. 5. The rear derailleur 140 moves the chain 109 between the plurality of sprockets included in the rear sprocket 108 on the basis of the operation of the driver. The rear derailleur 140 moves the chain 109 on the basis of the operation of the driver with respect to the right brake lever 130.

The rear derailleur 140 includes a pulley portion 140A and a fixing portion 142. The pulley portion 140A includes a body portion 141 (long portion), a guide pulley 143, a tension pulley 144, and a connecting member 145 (long portion).

The body portion 141 is configured as including an electrically conductive material. The body portion 141 extends from the fixing portion 142 toward the guide pulley 143. The body portion 141 includes an end portion 141A. The end portion 141A includes a rounded portion that depends on the shape of the guide pulley 143. The rounded portion of the end portion 141A faces an opposite side of the fixing portion 142. In other words, the rounded portion of the end portion 141A faces the brake lever 130 illustrated in FIG. 5.

The fixing portion 142 is located at an end portion of the body portion 141 opposite the end portion 141A. The fixing portion 142 includes a through-hole into which a fastening member such as a bolt can be inserted. The fixing portion 142 is secured at or near the rear fork end 101H of the frame 101 illustrated in FIG. 5 by the fastening member.

The guide pulley 143 and the tension pulley 144 are located separated from one another. The guide pulley 143 is located closer to the rear sprocket 108 illustrated in FIG. 1 than the tension pulley 144. Each of the guide pulley 143 and the tension pulley 144 is capable of rotating the chain 109 of the bicycle 100. Each of the guide pulley 143 and the tension pulley 144 is configured as including a gear. The chain 109 illustrated in FIG. 1 is wound around each of the gear of the guide pulley 143 and the gear of the tension pulley 144.

The connecting member 145 is configured as including an electrically conductive member. The connecting member 145 extends from the guide pulley 143 toward the tension pulley 144. The connecting member 145 connects the guide pulley 143 and the tension pulley 144 together. The guide pulley 143 is located on one end of the connecting member 145. The tension pulley 144 is located on the other end of the connecting member 145. The connecting member 145 includes an outer surface 145A. The outer surface 145A is an outer surface facing an opposite side of the body portion 141, among the outer surfaces of the connecting member 145. In other words, the outer surface 145A is the outer surface facing the brake lever 130 illustrated in FIG. 5, among the outer surfaces of the connecting member 145.

The rear derailleur 140 according to the present embodiment may include at least one of antennas 1H, 1J, or 1K. By the rear derailleur 140 being provided with at least one of the antennas 1H, 1J, or 1K, the rear derailleur 140 can be given a wireless communication function. The rear derailleur 140 with a wireless communication function may be capable of communicating with the brake lever 130 with a wireless communication function illustrated in FIG. 5. In this case, the antennas 1H, 1J, 1K may be disposed on the rear derailleur 140 at a section facing the brake lever 130, i.e., the communication partner. Also, there is a low probability of the driver touching the rear derailleur 140. By disposing the antennas 1H, 1J, 1K on the rear derailleur 140, the probability that the antennas 1H, 1J, 1K fail due to the driver touching the antennas 1H, 1J, 1K can be reduced. The antennas 1H, 1J, 1K have an identical configuration to the antenna 1 illustrated in FIG. 1 or the antenna 1a illustrated in FIG. 4. In other words, the antennas 1H, 1J, 1K include the first conductor 31, the second conductor 32, the third conductor 40, the fourth conductor 50, and the power supply line 60.

The antenna 1H may be disposed on the rear derailleur 140 with the fourth conductor 50 facing the connecting member 145 as a long portion. The antenna 1H may be located on connecting member 145. In a case where the antenna 1H is disposed on the connecting member 145, the connecting member 145 may correspond to the metal component 2 illustrated in FIG. 3 or FIG. 4. In a case where the antenna 1H is not provided with the circuit board 70 and the housing 80 illustrated in FIGS. 3 and 4, the fourth conductor 50 may be disposed on the connecting member 145 in direct contact with the connecting member 145, i.e., the metal component 2. In a similar manner to the antenna 1A, by disposing the antenna 1H with the fourth conductor 50 facing the connecting member 145, the connecting member 145 including the electrically conductive material may be located on the negative Z-axis side as illustrated in FIG. 1 and the like of the antenna 1H. Such a configuration may maintain the emission efficiency of the antenna 1H.

The antenna 1H may be disposed on the connecting member 145 such that the X direction illustrated in FIG. 1 and the like is aligned with the direction in which the connecting member 145 extends. With such a configuration, similar to the antenna 1A, a current can be induced in the connecting member 145 when the antenna 1H emits electromagnetic waves. When the antenna 1H emits electromagnetic waves, the overall emission efficiency of the antenna 1H can be improved by the connecting member 145 emitting the current induced in the connecting member 145 as electromagnetic waves.

The antenna 1H may be disposed on the outer surface 145A facing the brake lever 130, among the outer surfaces of the connecting member 145. By disposing the antenna 1H on outer surface 145A, communication efficiency between the antenna 1H and the brake lever 130 as a communication partner may be improved. In a case where the antenna 1H does not include the secondary emitter 82 illustrated in FIGS. 3 and 4, the antenna 1H may be disposed such that the third conductor 40 faces the brake lever 130, i.e., the communication partner. Also, in a case where the antenna 1H includes the secondary emitter 82 illustrated in FIGS. 3 and 4, the antenna 1H may be disposed such that the emission direction of the secondary emitter 82 faces the brake lever 130, i.e., the communication partner. In other words, the antenna 1H may be disposed such that the positive direction of the Z-axis illustrated in FIGS. 3 and 4 is aligned with the direction from the connecting member 145 toward the brake lever 130. By the third conductor 40 or the secondary emitter 82 emitting electromagnetic waves facing the brake lever 130, communication efficiency between the antenna 1H and the brake lever 130 as a communication partner can be improved.

The antennas 1J, 1K may be disposed on the rear derailleur 140 with the fourth conductor 50 facing the body portion 141 as a long portion. In a case where each of the antennas 1J, 1K is disposed on the body portion 141, the body portion 141 may correspond to the metal component 2 illustrated in FIG. 3 or FIG. 4. In a case where the antennas 1J, 1K are not provided with the circuit board 70 and the housing 80 illustrated in FIGS. 3 and 4, the fourth conductor 50 may be disposed on the body portion 141 in direct contact with the body portion 141, i.e., the metal component 2. In a similar manner to the antenna 1H, by disposing the antennas 1J, 1K with the fourth conductor 50 facing the body portion 141, the emission efficiency of the antennas 1J, 1K can be maintained.

In a similar manner to the antenna 1H, in a case where the antennas 1J, 1K do not include the secondary emitter 82 illustrated in FIGS. 3 and 4, the antennas 1J, 1K may be disposed such that the third conductor 40 faces the brake lever 130, i.e., the communication partner. Also, in a similar manner to the antenna 1H, in a case where the antennas 1J, 1K include the secondary emitter 82 illustrated in FIGS. 3 and 4, the antennas 1J, 1K may be disposed such that the emission direction of the secondary emitter 82 faces the brake lever 130, i.e., the communication partner.

The antenna 1J may be disposed at the rounded portion of the end portion 141A of the body portion 141. As described above, the rounded portion of the end portion 141A faces the brake lever 130 illustrated in FIG. 5. By disposing antenna 1J at the rounded portion of the end portion 141A, communication efficiency between the antenna 1J and the brake lever 130 as a communication partner may be improved.

The antenna 1K may be disposed on the body portion 141 via a substrate 141B. The substrate 141B may include an electrically conductive material, or may be formed from a discretionary material such as a resin material. The position of the substrate 141B on the body portion 141 may be adjusted as appropriate depending on the communication partner of the antenna 1K.

Example of Functional Block of Bicycle

Figure 9:
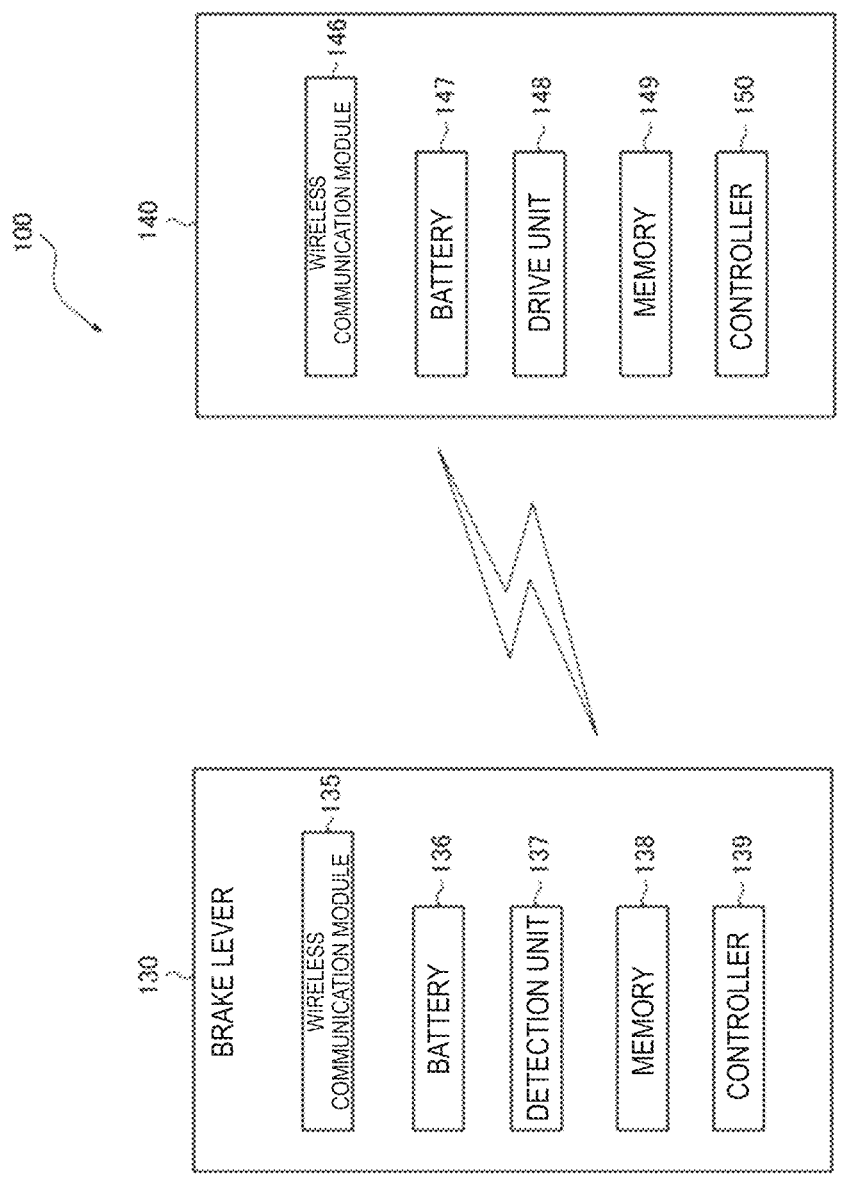
FIG. 9 is a functional block diagram of the bicycle illustrated in FIG. 5.

FIG. 9 is a functional block diagram of the bicycle 100 illustrated in FIG. 5. The bicycle 100 includes the brake lever 130 and the rear derailleur 140. The brake lever 130 is the right brake lever.

The brake lever 130 includes a wireless communication module 135, a battery 136, a detection unit 137, a memory 138, and a controller 139.

The wireless communication module 135 is configured as including: any one of the antennas 1A to 1F illustrated in FIG. 6 or the antenna 1G illustrated in FIG. 7; a radiation frequency (RF) module; and the like. The RF module may be implemented in the circuit board 70 illustrated in FIG. 3 or FIG. 4. The wireless communication module 135 can be configured to be compliant with a discretionary wireless communication standard. The discretionary wireless communication standard includes a near-field communication standard and a long range wireless communication standard. The near-field communication standard may include WiFi (trade name), Bluetooth (trade name), and wireless local area network (LAN). The long range communication standard may include 2G to 5G (Generation), LTE (Long Term Evolution), WiMAX (Worldwide Interoperability for Microwave Access), and a Personal Handy-phone System (PHS).

The wireless communication module 135 is configured to transmit a transmission signal from the brake lever 130 to the rear derailleur 140 on the basis of control by the controller 139. For example, the RF module of the wireless communication module 135 is configured to acquire a transmission signal from the controller 139. The RF module of the wireless communication module 135 is configured to supply electrical power in accordance with the acquired transmission signal to the power supply line 60 of the resonator 10 of the wireless communication module 135. By supplying electrical power in accordance with the transmission signal to the power supply line 60 of the resonator 10 of the wireless communication module 135, a transmission signal, i.e., electromagnetic waves, may be transmitted from the brake lever 130 to the rear derailleur 140.

The wireless communication module 135 is configured to receive electromagnetic waves, as a reception signal, from the rear derailleur 140 on the basis of control by the controller 139. The reception signal received by the wireless communication module 135 is output to the controller 139 via the power supply line 60 of the resonator 10.

The battery 136 may be the battery 73 illustrated in FIG. 3 or may be the battery 110 illustrated in FIG. 5. In a case where the battery 136 is the battery 73 illustrated in FIG. 3, it may be included in the wireless communication module 135.

The detection unit 137 is configured to detect an operation of the driver with respect to the first lever member 133 and the second lever member 134 illustrated in FIG. 6. Specifically, the detection unit 137 is configured to detect the amount of movement from a predetermined position for each of the first lever member 133 and the second lever member 134. The detection unit 137 may include a discretionary sensor, electric circuit, or the like capable of detecting the amount of movement. The detection unit 137 is configured to output the detection result to the controller 139.

The memory 138 may be constituted of, for example, a semiconductor memory or the like. The memory 138 may function as a working memory for the controller 139. The memory 138 may be included in the controller 139.

The controller 139 may include a processor, for example. The controller 139 may include one or more processors. The processor may include a general-purpose processor that reads a specific program in order to execute a specific function, and a dedicated processor dedicated to a specific processing. A dedicated processor may include an application-specific IC. The application-specific IC is also referred to as an Application Specific Integrated Circuit (ASIC). The processor may include a programmable logic device. The programmable logic device is also called a Programmable Logic Device (PLD). The PLD may include a Field-Programmable Gate Array (FPGA). The controller 139 may be either a System-on-a-Chip (SoC) or a System In a Package (SiP) that cooperates with one or more processors. The controller 139 may be configured to store various information and programs for operating each of the components of the brake lever 130 in the memory 138.

The controller 139 may be configured to generate a transmission signal that is transmitted by the wireless communication module 135 from the brake lever 130 to the rear derailleur 140. For example, the controller 139 may be configured to detect information relating to the gear of the rear derailleur 140 on the basis of the detection result of the detection unit 137. The information relating to the gear of the rear derailleur 140 can include information such as how many gears to go up in the rear derailleur 140 or how many gears to go down in the rear derailleur 140. The controller 139 may be configured to generate a transmission signal in accordance with the information relating to the detected gear of the rear derailleur 140. The controller 139 is configured to output the generated transmission signal to the wireless communication module 135.

The controller 139 may be configured to receive electromagnetic waves, i.e., a reception signal, from the rear derailleur 140 via the wireless communication module 135.

The rear derailleur 140 includes a wireless communication module 146, a battery 147, a drive unit 148, a memory 149, and a controller 150.

The wireless communication module 146 is configured as including: any one of the antennas 1H, 1J, 1K illustrated in FIG. 8; an RF module; and the like. The wireless communication module 146, similar to the wireless communication module 135, may be configured to be compliant with a discretionary wireless communication standard. The discretionary wireless communication standard may include a near-field communication standard and a long range wireless communication standard as described above for the wireless communication module 135.

The wireless communication module 146 is configured to transmit a transmission signal from the rear derailleur 140 to the brake lever 130 on the basis of control by the controller 150. For example, the RF module of the wireless communication module 146 is configured to acquire a transmission signal from the controller 150. The RF module of the wireless communication module 146 is configured to supply electrical power in accordance with the acquired transmission signal to the power supply line 60 of the resonator 10 of the wireless communication module 146. By supplying electrical power in accordance with the transmission signal to the power supply line 60 of the resonator 10 of the wireless communication module 146, a transmission signal, i.e., electromagnetic waves, may be transmitted from the rear derailleur 140 to the brake lever 130.

The wireless communication module 146 is configured to receive electromagnetic waves, as a reception signal, from the brake lever 130 on the basis of control by the controller 150. The reception signal received by the wireless communication module 146 is output to the controller 150 via the power supply line 60 of the resonator 10.

The battery 147 may be the battery 73 illustrated in FIG. 3 or may be the battery 110 illustrated in FIG. 5. In a case where the battery 147 is the battery 73 illustrated in FIG. 3, it may be included in the wireless communication module 146.

The drive unit 148 is configured as including an actuator such as an electric motor. The drive unit 148 moves the chain 109 between the plurality of sprockets included in the rear sprocket 108 on the basis of control by the controller 150.

The memory 149 may be constituted of, for example, a semiconductor memory or the like. The memory 149 may function as a working memory for the controller 150. The memory 149 may be included in the controller 150.

The controller 150 may include a processor, for example. The controller 150 may include one or more processors. The processor may include a general-purpose processor that reads a specific program in order to execute a specific function, and a dedicated processor dedicated to a specific processing. A dedicated processor may include an application-specific IC. The processor may include a programmable logic device. The PLD may include an FPGA. The controller 150 may be either a SoC or a SiP that cooperates with one or more processors. The controller 150 may be configured to store various information and programs for operating each of the components of the rear derailleur 140 in the memory 149.

The controller 150 may be configured to receive electromagnetic waves, i.e., a reception signal, from the brake lever 130 via the wireless communication module 146. The reception signal may include information relating to the gear of the rear derailleur 140. The controller 150 may drive the drive unit 148 on the basis of information relating to the gear of the rear derailleur 140. In other words, the controller 150 may move the chain 109 between the plurality of sprockets included in the rear sprocket 108 on the basis of information relating to the gear of the rear derailleur 140.

The controller 150 may be configured to generate a transmission signal that is transmitted by the wireless communication module 146 from the rear derailleur 140 to the brake lever 130.

In this manner, in the brake lever 130, the antennas 1A to 1F are disposed so that the fourth conductor 50 faces the first lever member 133 or the clamp portion 132 including the electrically conductive material, thereby maintaining the emission efficiency of the antennas 1A to 1F. In addition, in the rear derailleur 140, the antennas 1G, 1H, 1J are disposed so that the fourth conductor 50 faces the body portion 141 or the connecting member 145 including the electrically conductive material, thereby maintaining the emission efficiency of the antennas 1G, 1H, 1J. With such a configuration, the brake lever 130 and the rear derailleur 140 can be configured to wirelessly communicate with each other. By the brake lever 130 and the rear derailleur 140 being configured to wirelessly communicate with each other, the amount/number of wires such as cables attached to the bicycle 100 can be reduced. By reducing the amount/number of wires attached to the bicycle 100, the weight of the bicycle 100 can be reduced. The weight reduction of the bicycle 100 may improve the user-friendliness of the bicycle 100. Thus, according to an embodiment of the present disclosure, a novel brake lever may be provided.

The configurations according to the present disclosure are not limited only to the embodiments described above, and some variations or changes can be made. For example, the functions and the like included in each of the components and the like can be repositioned as long as inconsistencies are logically avoided, and it is possible to combine into one or divide a plurality of components or the like.

For example, in the above-described embodiment, it has been described that the communication partner of the brake lever 130 is the rear derailleur 140. Also, it has been described that the communication partner of the rear derailleur 140 is the brake lever 130. However, the communication partner of the brake lever 130 is not limited to being the rear derailleur 140. Also, the communication partner of the rear derailleur 140 is not limited to being the brake lever 130. The communication partner of the brake lever 130 and the rear derailleur 140 may include a component external device of the bicycle 100 or the like. For example, the component of the bicycle 100 corresponding to the communication partner of the brake lever 130 and the rear derailleur 140 may include the front derailleur 120, a multi-function display, or the like. For example, the external device corresponding to the communication partner of the brake lever 130 and the rear derailleur 140 may include a smartphone of the driver, a server device, or the like.

In the above-described embodiment, the brake lever 130 is configured to detect the operation of a driver with respect to the rear derailleur 140.

Specifically, in the specifications of the first lever member 133, the rear derailleur 140 is configured to shift down a gear when the first lever member 133 is moved in the direction B. Also, in the specifications of the second lever member 134, the rear derailleur 140 is configured to shift up a gear when the second lever member 134 is moved in the direction B. However, the brake lever 130 may be configured to detect the operation of the driver with respect to a discretionary component of the bicycle 100. For example, the second lever member 134 may be configured to be able to detect the operation of the driver with respect to a discretionary component.

The drawings for describing the configuration according to the present disclosure are schematic. The dimensional proportions and the like in the drawings do not necessarily coincide with the actual values.

In the present disclosure, description of "first", "second", "third", and the like is an example of an identifier for distinguishing the configurations. Configurations distinguished in the description by "first", "second", and the like in the present disclosure are interchangeable in terms of the number of the configuration. For example, the identifiers, "first" and "second", for the first conductor against the second conductor can be interchanged. The identifiers are interchanged simultaneously. The configurations are distinguished after the identifiers are interchanged. The identifiers may be deleted. Configurations with deleted identifiers are distinguished by reference signs. No interpretation on the order of the configurations, no grounds for the presence of an identifier of a lower value, and no grounds for the presence of an identifier of a higher value shall be given based solely on the description of identifiers such as "first" and "second" in the present disclosure.

REFERENCE SIGNS LIST 1, 1a, 1A, 1B, 1C, 1D, 1E, 1F, 1G, 1H, 1J, 1K Antenna
2 Metal component
10 Resonator
20 Base
21 Upper surface
22 Lower surface
30 Conductor pair
31 First conductor
32 Second conductor
33, 34 Conductor layer
35, 36 Conductor
40 Third conductor
41 First conductor layer
42, 42A, 42B Second conductor layer
50 Fourth conductor
51 Opening
60 Power supply line
70 Circuit board
71 Insulation substrate
72 Conductor layer
73 Battery
80, 81 Housing
80A, 81A Upper surface
81B Lower surface
82 Secondary emitter
82A First portion
82B First extension portion
82C Second extension portion
100 Bicycle
101 Frame
101A Head tube
101B Front fork
101C Seat stay
101D Down tube
101H Rear fork end
102R, 102L Handlebar
103 Crank
103A Crankshaft
103B Arm
104 Pedal
105 Front wheel
106 Rear wheel
107 Front sprocket
108 Rear sprocket
109 Chain
110 Battery
120 Front derailleur
130 Brake lever
131 Body portion
132 Clamp portion (long portion)
132A Outer surface
132B Substrate
133 First lever member (Long portion)
133A, 133B Outer surface
134 Second lever member
134A Plate-like portion
134B Outer surface
134C Side surface
134D Connection portion
135 Wireless communication module
136 Battery
137 Detection unit
138 Memory
139 Controller
140 Rear derailleur (Transmission)
140A Pulley portion
141 Body portion (long portion)
141A End portion
141B Substrate
142 Fixing portion
143 Guide pulley
144 Tension pulley
145 Connecting member (long portion)
145A Outer surface
146 Wireless communication module 147 Battery
148 Drive unit
149 Memory
150 Controller

The invention claimed is:

1. A brake lever attachable to a handlebar, the brake lever comprising:
   an elongated portion comprising an electrically conductive material; and
   an antenna located on the elongated portion, wherein
   the antenna comprises:
   a first conductor,
   a second conductor facing the first conductor in a first direction,
   a third conductor located between the first conductor and the second conductor, the third conductor extending in the first direction and being configured to capacitively connect the first conductor and the second conductor,
   a fourth conductor connected to the first conductor and the second conductor, the fourth conductor extending in the first direction, and
   a power supply line configured to be electromagnetically connected to the third conductor, and
   the fourth conductor faces the elongated portion.

2. The brake lever according to claim 1, wherein
   the elongated portion is a first lever member; and
   the antenna is disposed in the first direction aligned with a direction the first lever member extends.

3. The brake lever according to claim 2, further comprising
   a clamp portion capable of gripping the handlebar, wherein
   the antenna is located on an outer surface facing the clamp portion, among outer surfaces of the first lever member.

4. The brake lever according to claim 1, wherein
   the elongated portion is a first lever member,
   a clamp portion capable of gripping the handlebar and a second lever member located closer to the clamp portion than the first lever member are further provided, and
   the antenna is located on the second lever member.

5. The brake lever according to claim 4, further comprising
   a body portion, wherein
   the second lever member comprises
   a portion comprising a side surface facing the clamp portion and
   a connection portion connecting the portion and the body portion, and
   the antenna is located on at least one of the side surface or the connection portion.

6. The brake lever according to claim 1, further comprising
   a clamp portion having a ring shape capable of gripping the handlebar, wherein
   the elongated portion is the clamp portion having a ring shape, and
   the antenna is located on the clamp portion having a ring shape in the first direction aligned with a circumferential direction of the clamp portion having a ring shape.

7. The brake lever according to claim 1, wherein
   at least a portion of the third conductor faces a communication partner of the antenna.

8. The brake lever according to claim 7, wherein
   the communication partner is a rear derailleur corresponding to the brake lever and comprising a wireless communication function.

9. The brake lever according to claim 1, wherein
   the antenna further comprises a secondary emitter facing the third conductor, and
   an emission direction of the secondary emitter faces a communication partner of the antenna.

10. A transmission for a bicycle, the transmission comprising:
    an antenna; and
    a pulley portion comprising an electrically conductive material, wherein
    the antenna comprises:
    a first conductor,
    a second conductor facing the first conductor in a first direction,
    a third conductor located between the first conductor and the second conductor, the third conductor extending in the first direction and capacitively connecting the first conductor and the second conductor,
    a fourth conductor connected to the first conductor and the second conductor, the fourth conductor extending in the first direction, and
    a power supply line electromagnetically connected to the third conductor, and
    the fourth conductor faces the pulley portion.

11. The transmission according to claim 10, wherein
    the pulley portion further comprises:
    two pulleys located separated from one another and capable of rotating a chain of the bicycle,
    and
    a connecting member that connects the two pulleys, and
    the fourth conductor faces one of the two pulleys or the connecting member.

12. The transmission according to claim 11, wherein
    the first direction is aligned with a direction along which one of the two pulleys or the connecting member extends.

13. The transmission according to claim 10, wherein
    the pulley portion further comprises a body portion, and
    the antenna is disposed on the body portion.

14. The transmission according to claim 13, further comprising
    a pulley capable of rotating a chain of the bicycle, wherein
    an end portion of the body portion comprises a rounded portion that depends on a shape of the pulley, and
    the antenna is disposed at the rounded portion.

15. The transmission according to claim 10, wherein
    the third conductor faces a communication partner of the antenna.

16. The transmission according to claim 15, wherein
    the transmission is a rear derailleur, and
    the communication partner is a brake lever corresponding to the rear derailleur and comprising a wireless communication function.

17. The transmission according to claim 10, wherein
    the antenna further comprises a secondary emitter facing the third conductor, and
    an emission direction of the secondary emitter faces a communication partner of the antenna.

* * * * *